US008660138B2

(12) United States Patent
Wang et al.

(10) Patent No.: US 8,660,138 B2
(45) Date of Patent: Feb. 25, 2014

(54) METHODS, APPARATUS AND ARTICLES OF MANUFACTURE TO ALLOCATE PORTS TO VECTORED DIGITAL SUBSCRIBER LINE (DSL) GROUPS

(75) Inventors: Jin Wang, Fremont, CA (US); Richard D. Hart, Concord, CA (US); Raghvendra Savoor, Walnut Creek, CA (US); Gary Tennyson, Pelham, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 356 days.

(21) Appl. No.: 12/962,384

(22) Filed: Dec. 7, 2010

(65) Prior Publication Data
US 2012/0140803 A1 Jun. 7, 2012

(51) Int. Cl.
*H04J 3/16* (2006.01)
*H04M 1/24* (2006.01)
*H04B 1/38* (2006.01)

(52) U.S. Cl.
USPC .................. 370/465; 379/27.01; 375/222

(58) Field of Classification Search
USPC ........................ 370/465, 222, 260
See application file for complete search history.

(56) References Cited

U.S. PATENT DOCUMENTS

| 5,563,882 | A | 10/1996 | Bruno et al. |
| 6,434,221 | B1 * | 8/2002 | Chong ................ 379/27.01 |
| 6,956,847 | B2 | 10/2005 | Heston et al. |
| 6,977,922 | B2 | 12/2005 | Blanset et al. |
| 6,990,196 | B2 | 1/2006 | Zeng et al. |
| 7,103,001 | B1 | 9/2006 | Cordsmeyer et al. |
| 7,321,981 | B1 | 1/2008 | Muntz |
| 7,616,578 | B2 | 11/2009 | Chandrasekaran |
| 7,797,464 | B2 | 9/2010 | Mes et al. |
| 2005/0060394 | A1 | 3/2005 | Frechette et al. |
| 2006/0274893 | A1 * | 12/2006 | Cioffi et al. ............ 379/399.01 |
| 2007/0110032 | A1 * | 5/2007 | Pimpler et al. ............ 370/352 |
| 2008/0170609 | A1 | 7/2008 | Heidari et al. |
| 2010/0091661 | A1 | 4/2010 | Cordsmeyer et al. |
| 2010/0274943 | A1 | 10/2010 | Mahadevan et al. |

FOREIGN PATENT DOCUMENTS

| EP | 1523139 | | 4/2005 |
| SE | EP 1895 672 | * | 3/2008 |

* cited by examiner

*Primary Examiner* — Afshawn Towfighi
(74) *Attorney, Agent, or Firm* — Hanley, Flight & Zimmerman, LLC

(57) ABSTRACT

Example methods, apparatus and articles of manufacture to allocate ports to vectored digital subscriber line (DSL) groups are disclosed. A disclosed example method includes obtaining data representative of a statistical distribution of service penetration for a non-vectored DSL service, estimating an expected vectored DSL group size from the data, and configuring a DSL access multiplexer (DSLAM) to reserve a number of ports of the DSLAM for a vectored DSL group based on the expected vectored DSL group size.

10 Claims, 4 Drawing Sheets

_(1)_

METHODS, APPARATUS AND ARTICLES OF MANUFACTURE TO ALLOCATE PORTS TO VECTORED DIGITAL SUBSCRIBER LINE (DSL) GROUPS

FIELD OF THE DISCLOSURE

This disclosure relates generally to vectored digital subscriber line (DSL) services and, more particularly, to methods, apparatus and articles of manufacture to allocate ports to vectored DSL groups.

BACKGROUND

Vectored DSL is an emerging DSL technology that offers significant improvements in downstream transmission rates over twisted-pair copper wire. In a vectored DSL communication system, a vectoring engine uses collected measurements characterizing crosstalk between a set of subscriber lines to cancel the effects of crosstalk noise experienced by those subscriber lines.

DETAILED DESCRIPTION

Example methods, apparatus and articles of manufacture to allocate ports to vectored digital subscriber line (DSL) groups are disclosed. A disclosed example method includes obtaining data representative of a statistical distribution of service penetration for a non-vectored DSL service, estimating an expected vectored DSL group size from the data; and configuring a DSL access multiplexer (DSLAM) to reserve a number of ports of the DSLAM for a vectored DSL group based on the expected vectored DSL group size.

A disclosed example apparatus includes a port assignment database to store data representative of a statistical distribution of service penetration for a non-vectored DSL service, a vectored DSL group size estimator to compute an expected vectored DSL group size based on the data, and a mechanized loop assignment center to reserve a number of ports of a DSLAM line card for a vectored DSL group based on the expected vectored DSL group size.

Figure 1:
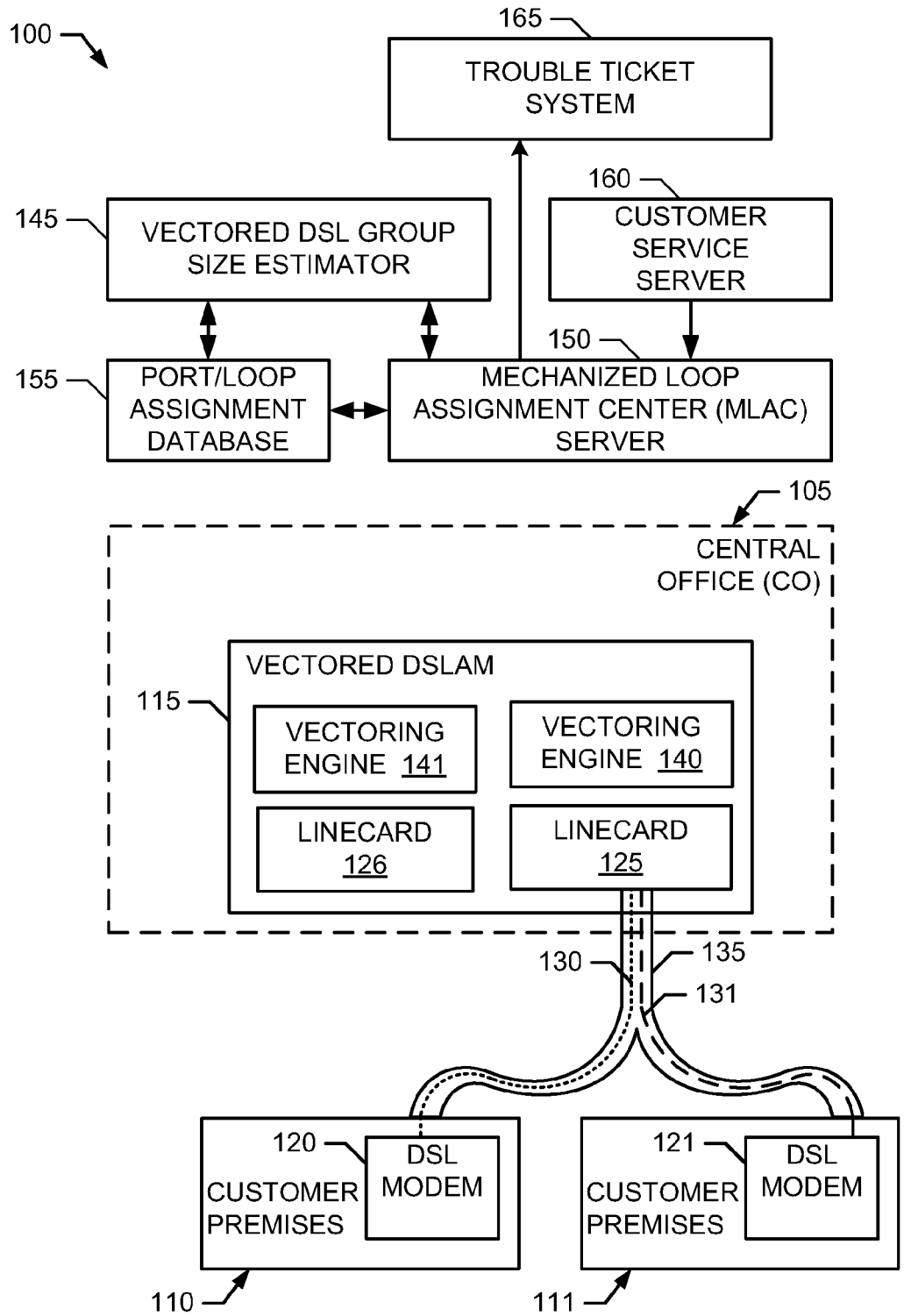
FIG. 1 is a schematic illustration of an example vectored DSL communication system implemented in accordance with the teachings of this disclosure.

FIG. 1 illustrates an example vectored DSL communication system 100. The example vectored DSL communication system 100 of FIG. 1 includes any number and/or type(s) of central offices (COs) 105, remote terminals (RTs) and/or serving area interfaces (SAIs). The example CO 105 of FIG. 1, other COs, RTs and/or SAIs are used to provide data and/or communication services to one or more customer premises, two of which are designated at reference numerals 110 and 111. Example data and/or communication services include, but are not limited to, telephone services, Internet services, data services, messaging services, instant messaging services, electronic mail (email) services, chat services, video services, audio services, gaming services.

To provide communication services to the customer premises 110, 111, the example CO 105 of FIG. 1 includes any number and/or type(s) of vectored DSLAM(s) 115 and/or vectored video-ready access device(s) (VRAD(s)), and the example customer premises 110, 111 of FIG. 1 each include any type(s) of customer-premises equipment (CPE) DSL modems 120 and 121. The example vectored DSLAM 115 of FIG. 1 includes and/or implements CO DSL modems (not shown) for respective ones of the customer premises 110, 111. CO DSL modems are sometimes referred to in the industry as "DSLAM ports," "VRAD ports," or simply "ports." In the illustrated example of FIG. 1, CO DSL modems are implemented on DSLAM line cards 125, 126 of the vectored DSLAM 115. Each of the example line cards 125, 126 of FIG. 1 implements a plurality of CO DSL modems for respective ones of a plurality of CPE DSL modems (e.g., the example CPE DSL modems 120, 121). An example line card 125, 126 implements sixty-four CO DSL modems.

The example vectored DSLAM 115, the CO DSL modems within the vectored DSLAM 115, and/or the example CPE DSL modems 120, 121 of FIG. 1 may be implemented, for example, in accordance with the International Telecommunications Union-Telecommunications Sector (ITU-T) G.993.x family of standards for very high-speed DSL (VDSL), and/or the ITU-T G.992.x family of standards for asymmetric DSL (ADSL). However, the CO DSL modems and/or the CPE DSL modems 120, 121 may be implemented in accordance with any past, present and/or future standard, specification and/or recommendation.

While in the illustrated example of FIG. 1, the vectored DSLAM 115 is implemented at the CO 105, the vectored DSLAM 115, another DSLAM and/or a VRAD may be, additionally or alternatively, implemented at an RT, at an SAI and/or at any other location between the CO 105 and the customer premises 110, 111. In such instances, a fiber-optic cable (not shown) may be used, for example, to communicatively couple the remotely located DSLAM/VRAD to the CO 105.

In the illustrated example of FIG. 1, the vectored DSLAM 115 provides DSL services to the CPE DSL modems 120, 121 via respective subscriber lines 130 and 131. Subscriber lines are sometimes also referred to in the industry as "wire-pairs," "telephone lines," "subscriber loops" and/or "loops." While throughout this disclosure reference is made to the example loops 130, 131 of FIG. 1, a loop (e.g., any of the example loops 130, 131) used to provide a DSL service to a customer premises location (e.g., any of the locations 110, 111) may include and/or be constructed from one or more segments of copper twisted-pair wire (e.g., any combination of a feeder one (F1) cable, a feeder two (F2) cable, a feeder three (F3) cable, a feeder four (F4) cable, a distribution cable, a drop cable, and/or customer-premises wiring), terminals, and/or distributions points (e.g., an RT, an SAI, a serving terminal, a vault, a pedestal and/or any other type(s) of wiring distribution points). Such segments of copper twisted-pair wire may be spliced and/or connected end-to-end, and/or may be connected at only one end, thereby creating one or more bridged-taps. Regardless of the number, type(s), gauge(s) and/or topology of copper twisted-pair wires used to construct the example loops 130, 131, they will be referred to herein in the singular form, but it will be understood that the term "loop" may refer to one or more copper twisted-pair wire segments and may include one or more bridged taps.

When two loops (e.g., the example loops 130, 131) are part of the same cable bundle or cable binder 135, the signal transmissions on one loop may cause or introduce crosstalk noise into other loops of the same binder 135. The amount of crosstalk noise varies with, for example, signal transmission level, frequency and/or length of the binder 135. Crosstalk noise may interfere with and/or reduce the achievable transmission speed on a loop. An example binder 135 consists of twenty-five copper twisted-pair wires.

To reduce the effects of crosstalk interference, the example vectored DSLAM 115 includes any number and/or type(s) of vectoring engines 140, 141. The example vectoring engines 140, 141 of FIG. 1 obtain measurements representing the crosstalk between member loops of a vectored DSL group from the CO DSL modems and/or the CPE DSL modems 120, 121 associated with the vectored DSL group. As used herein, the term "vectored DSL group" is a group or set of loops 130, 131 contained in the same binder 135 for which a vectored DSL service is provisioned. Based on the obtained measurements, the example vectoring engines 140, 141 adjust one or more parameters of the CO DSL modems and/or the CPE DSL modems 120, 121 associated with the vectored DSL group to reduce, cancel, mitigate and/or minimize the effects of crosstalk and, thus, increase the transmission speeds achievable on each member loop 130, 131 of the vectored DSL group. While the vectoring engines 140, 141 and the line cards 125, 126 are depicted separately in FIG. 1, the line cards 125, 126 may each implement and/or include one or more of the vectoring engines 140, 141.

For non-vectored DSL services, there is no need for particular loops 130, 131 to be communicatively coupled to the particular line cards 125, 126. Thus, when a new non-vectored DSL service is provisioned for a particular loop 130, 131, the loop 130, 131 can be assigned and/or communicatively coupled to any vacant port of any line card 125, 126. However, vectored DSL services require that each member loop 130, 131 of a vectored DSL group be communicatively coupled to the same vectoring engine 140, 141. Given current technology and the computational load required to reduce crosstalk for a vectored DSL group, the example vectoring engines 140, 141 of FIG. 1 are only capable of reducing crosstalk for twenty-four to forty-eight loops 130, 131, which is similar to or less than the number of CO DSL modems implementable on the example line cards 125, 126. Accordingly, in the illustrated example of FIG. 1, each of the vectoring engines 140, 141 is only communicatively coupled to a single line card 125, 126. Thus, each member loop 130, 131 of a vectored DSL group is assigned to and communicatively coupled to the same line card 125, 126. However, if a present or future vectoring engine 140, 141 is communicatively coupleable to more than one line card 125, 126, the methods, apparatus and articles of manufacture to provision vectored DSL services disclosed herein can be readily extended.

When a new vectored DSL group is provisioned (e.g., when the first loop 130, 131 of a vectored DSL group is provisioned), the new vectored DSL group is assigned and/or allocated to a line card 125, 126 with a statistically sufficient number of available ports for the vectored DSL group. In other words, when the first loop 130, 131 of a new vectored DSL group is provisioned, additional ports of the same line card 125, 126 are reserved in anticipation of future vectored DSL services in the new vectored DSL group. If too small a number of ports is reserved, then requests for additional vectored DSL services in the new vectored DSL group may need to be rejected or may cause service disruptions to move the vectored DSL group to a different line card 125, 126. The rejection of requested services and/or service disruptions may cause decreased revenue and/or decreased customer satisfaction. If too large a number of ports is reserved, then DSLAM, line card and/or vectoring engine resources are wasted leading to increased capital expenditures. The methods, apparatus and articles of manufacture disclosed herein estimate, predict and/or anticipate the size of vectored DSL groups, and use the estimated vectored DSL group size during the provisioning of vectored DSL services.

In a typical DSL distribution area, there are 50 to 100 cable binders 135 and significantly fewer line cards 125, 126 (e.g., four 48-port line cards) and, thus, several binders 135 will share the same line card 125, 126. The methods, apparatus and articles of manufacture disclosed herein may be used to estimate, predict and/or anticipate the size of vectored DSL groups based on the statistics of DSL service penetration. In an example mature DSL market region, the penetration ratio of DSL services is typically 30% (e.g., about 8 loops in each 25-pair binder 135 carry a DSL service). Thus, in a mature DSL market region, the size of a vectored DSL group is expected to be between 1 and 8 ports. However, allocation of 8 ports per vectored DSL group is likely to result in excess capital expenditure, and an allocation of 1-2 ports per vectored DSL group is likely to result in excess service request rejections.

To estimate the expected or anticipated vectored DSL group size, the example communication system 100 of FIG. 1 includes a vectored DSL group size estimator 145. Based on data representative of the statistical distribution of service penetration for a similar (i.e., non-vectored) DSL such as VDSL, the example vectored DSL group size estimator 145 computes and/or determines the statistical, expected or anticipated vectored DSL group size. An example estimated vectored DSL group size is N, where N is selected so that the probability that the number of DSL services in a binder exceeding N is less than a threshold. This example criteria can be expressed mathematically as $$\text{Probability}(\text{number of DSL services in binder} > N) < X\% \qquad \text{EQN (1)}$$

where X % is a small value (e.g., 5%) representing a selected or acceptable risk of insufficient port allocation. The value of N can be determined using data representative of a statistical distribution of service penetration for a similar (i.e., non-vectored) DSL such as VDSL. Given a 25-pair binder, an example statistical distribution of service penetration for VDSL in an example mature VDSL service area is $$\text{Probability}(\text{number of DSL services in binder} > 0) = 43.6\%$$

$$\text{Probability}(\text{number of DSL services in binder} > 1) = 31.0\%$$

$$\text{Probability}(\text{number of DSL services in binder} > 2) = 20.5\%$$

$$\text{Probability}(\text{number of DSL services in binder} > 3) = 12.2\%$$

$$\text{Probability}(\text{number of DSL services in binder} > 4) = 7.0\%$$

$$\text{Probability}(\text{number of DSL services in binder} > 5) = 4.2\%$$

$$\text{Probability}(\text{number of DSL services in binder} > 6) = 2.3\%$$

Assuming a vectored DSL service will have similar penetration statistics, and selecting X %=5%, then a vectored DSL group is statistically expected to include 5 loops and, thus, 5 ports to be allocated and/or reserved for a new vectored DSL group.

Another example criteria includes the number of customer premises 110, 111 served or passed by the binder 135. For example, if only 2 customer premises 110, 111 are served by the particular binder 135, reserving 5 ports for a vectored DSL group associated with that binder 135 is excessive. This example criteria can be expressed mathematically as Probability(number of DSL services in binder>$N$ given the binder serves $M$ customer premises)<$X$%     EQN (2)

Yet another example criteria considers that several binders 135 will share the same line card 125, 126 and, thus, the reserved ports can be statistically shared across two or more vectored DSL groups. This example criteria can be expressed mathematically as Probability(number of DSL services in $Z$ binders connected to the same line cards>$N$)<$X$%     EQN (3)

To assign ports to the example loops 130, 131, the example vectored DSL communication system 100 of FIG. 1 includes any type of mechanized loop assignment center (MLAC) server 150 and a port/loop assignment database 155. Port to loop assignments may be stored in the example port/loop assignment database 155 of FIG. 1 using any number and/or type(s) of data structures. The example port/loop assignment database 155 may implemented using any number and/or type(s) of volatile and/or non-volatile memory(-ies), memory device(s) and/or storage device(s).

In response to, for example, an order for a new vectored DSL service for a particular loop 130, 131 received from, for example, any type of customer service server 160, the example MLAC server 150 of FIG. 1 queries the example vectored DSL group size estimator 145 to obtain an estimated vectored DSL group size. The example MLAC server 150 identifies or selects a line card 125, 126 having a sufficient number of available ports for the new vectored DSL group. The MLAC server 150 assigns and/or selects a particular port of the selected line card 125, 126 to the loop 130, 131 by updating the port/loop assignment database 155 and notifying appropriate technician and/or service personnel to couple the loop 125, 126 to the assigned port. The MLAC server 150 also reserves additional ports on the selected line card 125, 126 to accommodate anticipated future vectored DSL services in the new vectored DSL group.

If during the provisioning of an additional member loop of a vectored DSL group, the example MLAC server 150 together with the example vectored DSL group size estimator 145 determines that there are not enough available ports for the vectored DSL group to support anticipated future needs, the example MLAC server 150 of FIG. 1 automatically generates and/or submits a maintenance ticket to any type of trouble ticket system 165. Such an automatically generated and/or submitted maintenance ticket represents preventative, prospective, forecasted and/or projected maintenance needs that should be performed in order to, for example, reduce the likelihood that a future vectored DSL service requested service cannot be accepted and/or provisioned when requested by a subscriber. In response to the submitted maintenance ticket, appropriate service and/or maintenance personnel can be dispatched to move and/or relocate the vectored DSL group to a different line card 125, 126, if available. Alternatively, capacity planning personnel can analyze and/or consider the installation of additional ports at the CO 105.

While an example vectored DSL communication system 100 is illustrated in FIG. 1, one or more of the elements, processes and/or devices illustrated in FIG. 1 may be combined, divided, re-arranged, omitted, eliminated and/or implemented in any other way. Further, the example vectored DSL group size estimator 145, the example MLAC server 150, the example port/loop assignment database 155, the example customer service server 160 and/or the example trouble ticket system 165 may be implemented by hardware, software, firmware and/or any combination of hardware, software and/or firmware. Thus, for example, any of the example vectored DSL group size estimator 145, the example MLAC server 150, the example port/loop assignment database 155, the example customer service server 160 and/or the example trouble ticket system 165 could be implemented by the example processor platform P100 of FIG. 4 and/or one or more circuit(s), programmable processor(s), application specific integrated circuit(s) (ASIC(s)), programmable logic device(s) (PLD(s)) and/or field programmable logic device(s) (FPLD(s)), field-programmable gate array(s) (FPGA(s)), fuses, etc. When any apparatus claim of this patent incorporating one or more of these elements is read to cover a purely software and/or firmware implementation, at least one of the example vectored DSL group size estimator 145, the example MLAC server 150, the example port/loop assignment database 155, the example customer service server 160 and/or the example trouble ticket system 165 are hereby expressly defined to include a tangible article of manufacture such as a tangible computer-readable medium storing the firmware and/or software. Further still, any of the example vectored DSL group size estimator 145, the example MLAC server 150, the example port/loop assignment database 155, the example customer service server 160 and/or the example trouble ticket system 165 may include one or more elements, processes and/or devices in addition to, or instead of, those illustrated in FIG. 1, and/or may include more than one of any or all of the illustrated elements, processes and devices.

As used herein, the term tangible computer-readable medium is expressly defined to include any type of computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 11. As used herein, the term non-transitory computer-readable medium is expressly defined to include any type of computer-readable medium and to exclude propagating signals.

Figure 2:
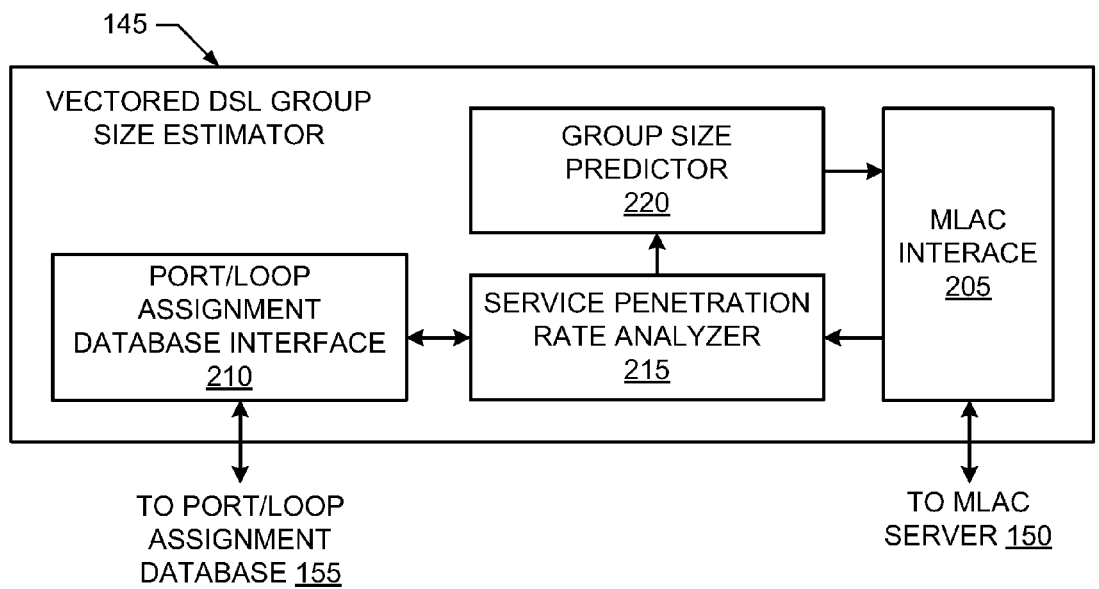
FIG. 2 illustrates an example manner of implementing the example vectored DSL port allocator of FIG. 1.

FIG. 2 illustrates an example manner of implementing the example vectored DSL group size estimator 145 of FIG. 1. To enable the MLAC server 150 to request and obtain estimated vectored DSL group sizes, the example vectored DSL group size estimator 145 includes an MLAC interface 205. The example MLAC interface 205 implements any number and/or type(s) of application programming interface(s), message(s) and/or protocol(s) to enable the MLAC server 150 to request and obtain estimated vectored DSL group sizes.

To obtain data representative of a statistical distribution of service penetration for a non-vectored DSL service, the example vectored DSL group size estimator 145 includes a port/loop assignment database interface 210. Using any number and/or type(s) of application programming interface(s), message(s) and/or protocol(s), the example port/loop assignment database interface 210 of FIG. 1 queries the example port/loop assignment database 155 (FIG. 1) to obtain information regarding the number of DSL services allocated in different binders, the number of customer premises served by different binders and/or the number of binders sharing different line cards.

To tabulate, compute and/or generate values representing service penetration, the example vectored DSL group size estimator 145 includes a service penetration rate analyzer 215. The example service penetration rate analyzer 215 of FIG. 2 obtains data representative of a statistical distribution of non-vectored DSL service penetration via the example port/loop assignment database interface 210, and analyzes the obtained data to compute the statistical distribution of non-vectored DSL service. For example, the service penetration rate analyzer 215 can count the number of binders 135 with 1 or more DSL services, the number of binders 135 with 2 or more DSL services, etc. Such count values represent a statistical distribution of service penetration.

To estimate vectored DSL group size, the example vectored DSL group size estimator 145 of FIG. 1 includes a group size predictor 220. The example group size predictor 220 computes probability values corresponding to the statistical count values computed by the example service penetration rate analyzer 215. For example, if 100 binders were analyzed by the service penetration rate analyzer 215 and the count of binders 135 with 3 or more DSL services is 21, then the probability that there are 3 or more DSL services in a binder is 21% (=21/100%). The group size predictor 220 compares the computed probabilities to determine the value of N as, for example, described above in connection with EQNs (1), (2) and (3). The identified value of N represents the statistically expected vectored DSL group size. The group size predictor 220 returns the value N to the MLAC server 150 via the MLAC interface 205.

While an example manner of implementing the example vectored DSL group size estimator 145 of FIG. 1 is shown in FIG. 2, one or more of the elements, processes and/or devices illustrated in FIG. 2 may be combined, divided, re-arranged, omitted, eliminated and/or implemented in any other way. Further, the example MLAC interface 205, the example port/loop assignment database interface 210, the example service penetration rate analyzer 215, the example group size predictor 220 and/or, more generally, the example vectored DSL group size estimator 145 of FIG. 2 may be implemented by hardware, software, firmware and/or any combination of hardware, software and/or firmware. Thus, for example, any of the example MLAC interface 205, the example port/loop assignment database interface 210, the example service penetration rate analyzer 215, the example group size predictor 220 and/or, more generally, the example vectored DSL group size estimator 145 could be implemented by the example processor platform P100 of FIG. 4 and/or one or more circuit(s), programmable processor(s), application specific integrated circuit(s) (ASIC(s)), programmable logic device(s) (PLD(s)) and/or field programmable logic device(s) (FPLD(s)), field-programmable gate array(s) (FPGA(s)), fuses, etc. When any apparatus claim of this patent incorporating one or more of these elements is read to cover a purely software and/or firmware implementation, at least one of the example MLAC interface 205, the example port/loop assignment database interface 210, the example service penetration rate analyzer 215, the example group size predictor 220 and/or, more generally, the example vectored DSL group size estimator 145 are hereby expressly defined to include a tangible article of manufacture such as a tangible computer-readable medium storing the firmware and/or software. Further still, any of the example MLAC interface 205, the example port/loop assignment database interface 210, the example service penetration rate analyzer 215, the example group size predictor 220 and/or, more generally, the example vectored DSL group size estimator 145 may include one or more elements, processes and/or devices in addition to, or instead of, those illustrated in FIG. 2, and/or may include more than one of any or all of the illustrated elements, processes and devices.

Figure 3:
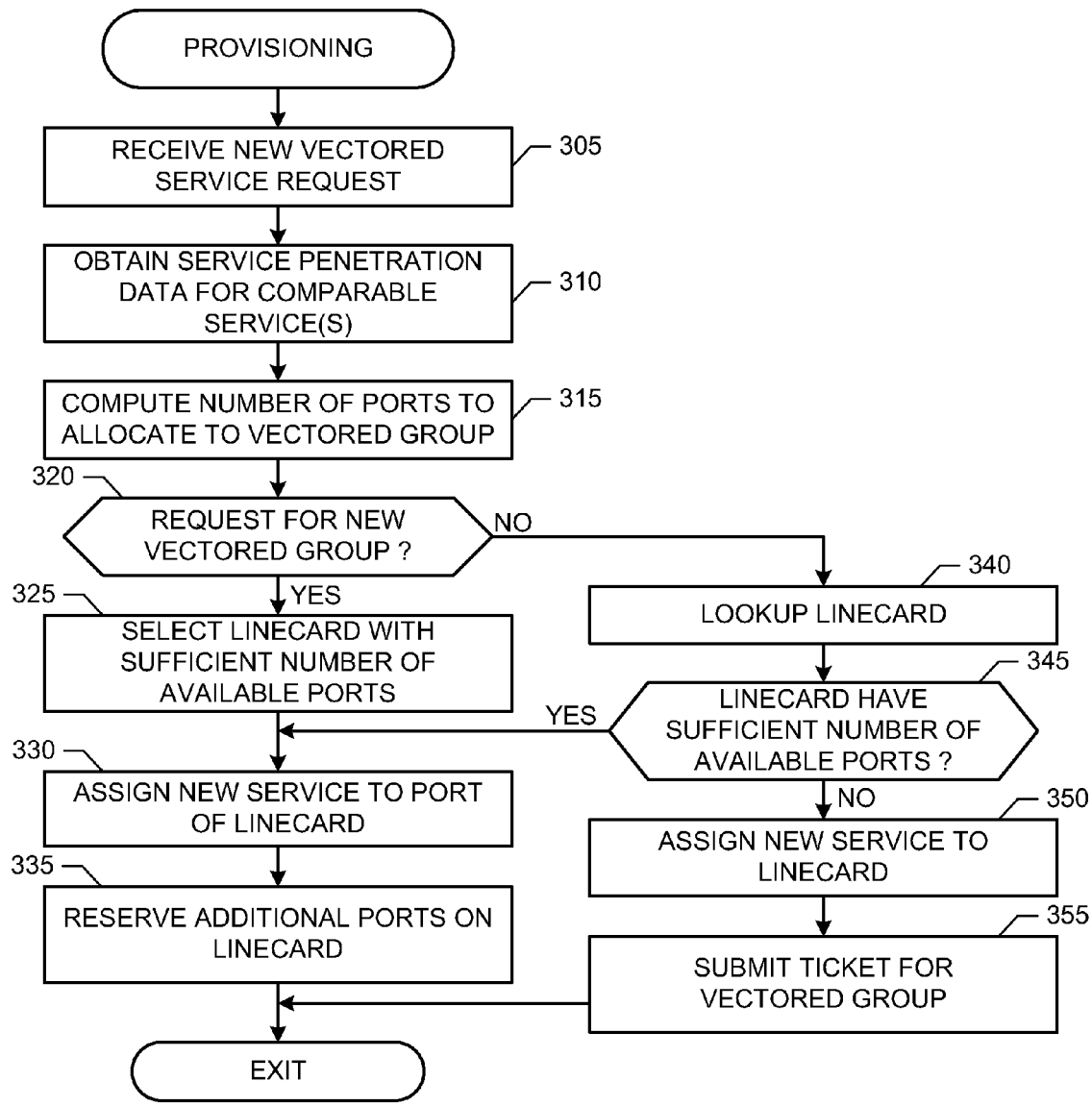
FIG. 3 is a flowchart representing an example process that may be embodied as machine-accessible instructions and executed by, for example, one or more processors to implement the example vectored DSL port allocator of FIGS. 1 and 2.

FIG. 3 is a flowchart representing an example process that may be embodied as machine-accessible instructions and executed by, for example, one or more processors to allocate ports to vectored DSL groups and provision a vectored DSL service. A processor, a controller and/or any other suitable processing device may be used, configured and/or programmed to perform the example process of FIG. 3. For example, the process of FIG. 3 may be embodied in coded instructions stored on a tangible computer-readable medium. Machine-readable instructions comprise, for example, instructions that cause a processor, a computer and/or a machine having a processor to perform one or more particular processes. Alternatively, some or all of the example process of FIG. 3 may be implemented using any combination(s) of ASIC(s), PLD(s), FPLD(s), FPGA(s), fuses, discrete logic, hardware, firmware, etc. Also, some or all of the example process of FIG. 3 may be implemented manually or as any combination of any of the foregoing techniques, for example, any combination of firmware, software, discrete logic and/or hardware. Further, many other methods of implementing the example operations of FIG. 3 may be employed. For example, the order of execution of the blocks may be changed, and/or one or more of the blocks described may be changed, eliminated, sub-divided, or combined. Additionally, the blocks of any or all of the example process of FIG. 3 may be carried out sequentially and/or carried out in parallel by, for example, separate processing threads, processors, devices, discrete logic, circuits, etc.

The example process of FIG. 3 begins with the example MLAC server 150 receiving a request for a new vectored DSL service (block 305). The example vectored DSL group size estimator 145 obtains data representative of a statistical distribution of penetration for a comparable DSL service from the port/loop assignment database 155 (block 310). Based on the obtained data, the example vectored DSL group size estimator 145 computes the statistically expected, anticipated and/or estimated vectored DSL group size (block 315).

If the vectored DSL service request represents a new vectored DSL group (block 320), the MLAC server 150 identifies a line card 125, 126 with sufficient available ports to accommodate the estimated vectored DSL group size (block 325). The MLAC server 150 assigns the requested service to the identified line card 125, 126 (block 330) and reserves additional ports on the line card 125, 126 to accommodate future vectored DSL services associated with the new vectored DSL group (block 335). Control then exits from the example process of FIG. 3.

Returning to block 320, if the vectored DSL services does not represent a new vectored DSL group (block 320), the MLAC server 150 identifies the line card 125, 126 currently assigned to the existing vectored DSL group (block 340). If the identified line card 125, 126 has sufficient available ports to accommodate the estimated vectored DSL group size less the already allocated ports of the vectored DSL group (block 345), control proceeds to block 330 to assign the vectored DSL service to a port of the line card 125, 126. If the identified line card 125, 126 does not have sufficient available ports to accommodate the estimated vectored DSL group size less the already allocated ports of the vectored DSL group (block 345), the MLAC server 150 assigns the new vectored DSL service to a port of the identified line card 125, 126, if available (block 350) and automatically submits a trouble ticket to notify maintenance, service and/or capacity planning personnel that a sufficient number of ports for the vectored DSL group is not available (block 355). For example, if 90% of the ports allocated to the vectored DSL group have been assigned to subscriber loops, the trouble ticket is submitted. In some examples, a submitted ticket is routed to the example MLAC server 150 to initiate further and/or additional capacity planning and/or demand forecasting for the vectored DSL group. Control then exits from the example process of FIG. 3.

Figure 4:
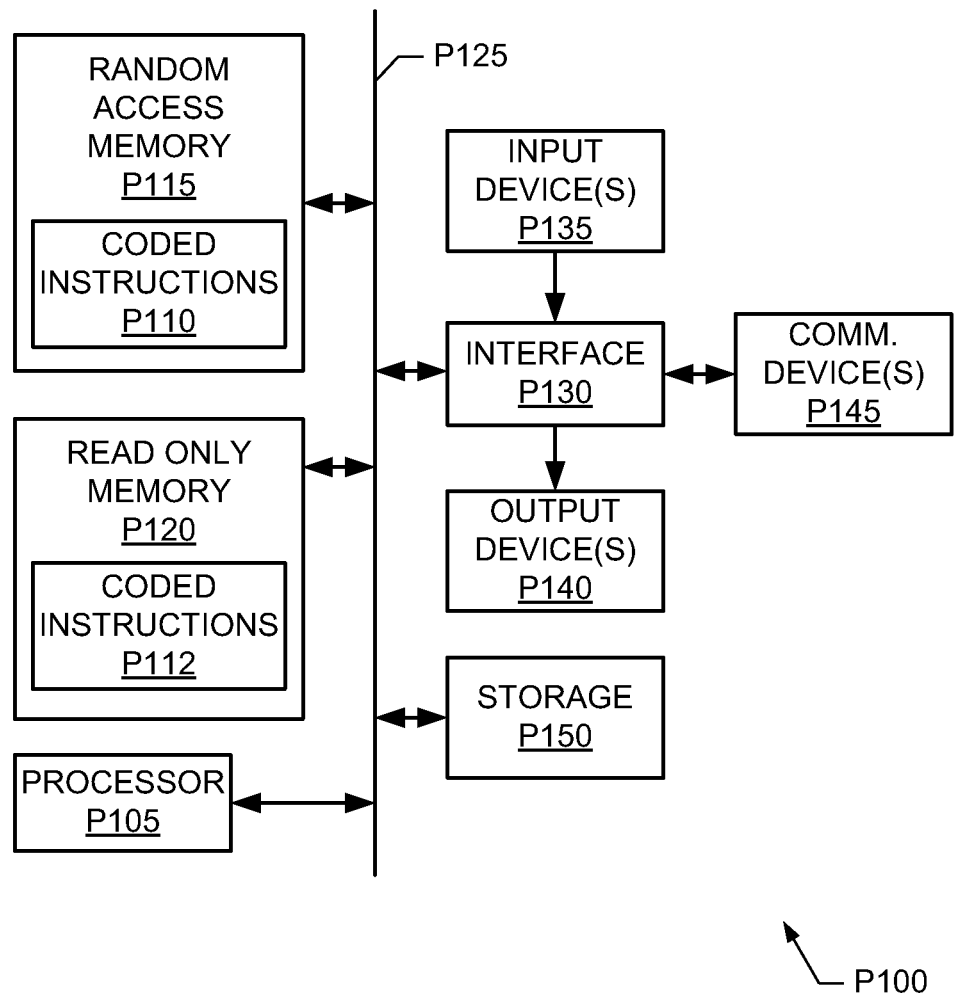
FIG. 4 is a schematic illustration of an example processor platform that may be used and/or programmed to perform the example process of FIG. 3 to allocate ports to vectored DSL groups.

FIG. 4 is a block diagram of an example processor platform P100 capable of executing the example process of FIG. 3 to allocate ports to vectored DSL groups and provision a vectored DSL service. The example processor platform P100 can be, for example, a computer, a workstation, a server and/or any other type of computing device containing a processor.

The processor platform P100 of the instant example includes at least one programmable processor P105. For example, the processor P105 can be implemented by one or more Intel® microprocessors from the Pentium® family, the Itanium® family or the XScale® family. Of course, other processors from other processor families and/or manufacturers are also appropriate. The processor P105 executes coded instructions P110 and/or P112 present in main memory of the processor P105 (e.g., within a volatile memory P115 and/or a non-volatile memory P120) and/or in a storage device P150. The processor P105 may execute, among other things, the example machine-accessible instructions of FIG. 3 to allocate ports to vectored DSL groups and provision a vectored DSL service. Thus, the coded instructions P110, P112 may include the example instructions of FIG. 3.

The processor P105 is in communication with the main memory including the non-volatile memory P110 and the volatile memory P115, and the storage device P150 via a bus P125. The volatile memory P115 may be implemented by Synchronous Dynamic Random Access Memory (SDRAM), Dynamic Random Access Memory (DRAM), RAMBUS Dynamic Random Access Memory (RDRAM) and/or any other type of RAM device. The non-volatile memory P110 may be implemented by flash memory and/or any other desired type of memory device. Access to the memory P115 and the memory P120 may be controlled by a memory controller.

The processor platform P100 also includes an interface circuit P130. Any type of interface standard, such as an external memory interface, serial port, general-purpose input/output, as an Ethernet interface, a universal serial bus (USB), and/or a PCI express interface, etc, may implement the interface circuit P130.

The interface circuit P130 may also includes one or more communication device(s) 145 such as a network interface card to facilitate exchange of data, packets, and/or routing information with other nodes, servers, devices and/or routers of a network.

In some examples, the processor platform P100 also includes one or more mass storage devices P150 to store software and/or data. Examples of such storage devices P150 include a floppy disk drive, a hard disk drive, a solid-state hard disk drive, a CD drive, a DVD drive and/or any other solid-state, magnetic and/or optical storage device. The example storage devices P150 may be used to, for example, store the example coded instructions of FIG. 3 and/or the port/loop assignment database 155 of FIG. 1.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
obtaining data representative of a statistical distribution of service penetration for a non-vectored digital subscriber line service;
estimating an expected vectored digital subscriber line group size based on the statistical distribution of service penetration, wherein estimating the expected vectored digital subscriber line group size comprises:
comparing a first threshold to a probability associated with a particular number of subscriber lines in a binder subscribing to the non-vectored digital subscriber line service; and
comparing a number of customer premises served by the binder to a second threshold; and
configuring a digital subscriber line access multiplexer to reserve a number of ports of the digital subscriber line access multiplexer for a vectored digital subscriber line group based on the expected vectored digital subscriber line group size.

2. A method as defined in claim 1, further comprising:
receiving a request for a vectored digital subscriber line service associated with a loop;
selecting a line card of the digital subscriber line access multiplexer having the number of ports available;
assigning the loop to the line card; and
reserving the number of ports on the line card for the vectored digital subscriber line group.

3. A method as defined in claim 2, wherein the expected vectored digital subscriber line group size is estimated in response to the request for the vectored digital subscriber line service.

4. A method as defined in claim 1, further comprising:
receiving a request for a digital subscriber line service associated with a loop;
assigning the loop to a line card associated with the vectored digital subscriber line group; and
comparing a difference between the number of ports and an available number of ports on the line card to a third threshold to determine whether to submit a maintenance ticket requesting reassignment of the vectored digital subscriber line group to a second line card.

5. A method as defined in claim 1, further comprising:
receiving a request for a digital subscriber line service associated with a loop;
assigning the loop to a line card associated with the vectored digital subscriber line group; and
comparing a difference between the number of ports and an available number of ports on a line card to a third threshold to determine whether to initiate forecasting a number of ports demand for the vectored digital subscriber line group.

6. An apparatus comprising:
memory comprising machine readable instructions; and
a processor to execute the machine readable instructions to perform operations comprising:

storing data representative of a statistical distribution of service penetration for a non-vectored digital subscriber line service;

computing an expected vectored digital subscriber line group size based on the statistical distribution of service penetration, wherein estimating the expected vectored digital subscriber line group size comprises:

comparing a first threshold to a probability associated with a particular number of subscriber lines in a binder providing the non-vectored digital subscriber line service; and comparing a number of customer premises served by the binder to a second threshold; and reserving a number of ports of a digital subscriber line access multiplexer for a vectored digital subscriber line group based on the expected vectored digital subscriber line group size.

7. An apparatus as defined in claim 6, wherein the operations further comprise:

receiving a request for a digital subscriber line service associated with a loop;

selecting a line card of the digital subscriber line access multiplexer having at least the number of ports available;

assigning the loop to the line card; and reserving the number of ports on the line card for the vectored digital subscriber line group.

8. A tangible computer-readable storage medium comprising instructions that, when executed, cause a machine to perform operations comprising:

obtaining data representative of a statistical distribution of service penetration for a non-vectored digital subscriber line service;

estimating an expected vectored digital subscriber line group size based on the statistical distribution of service penetration, wherein estimating the expected vectored digital subscriber line group size comprises:

comparing a first threshold to a probability associated with a particular number of subscriber lines in a binder providing the non-vectored digital subscriber line service; and comparing a number of customer premises served by the binder to a second threshold; and reserving a number of ports of a digital subscriber line access multiplexer for a vectored digital subscriber line group based on the expected vectored digital subscriber line group size.

9. A storage medium as defined in claim 8, wherein the operations further comprise:

receiving a request for a vectored digital subscriber line service associated with a loop;

selecting a line card of the digital subscriber line access multiplexer having the number of ports available;

assigning the loop to the line card; and reserving the number of ports on the line card for the vectored digital subscriber line group.

10. A storage medium as defined in claim 9, wherein the operations further comprise estimating the expected vectored digital subscriber line group size in response to the request for the vectored digital subscriber line service.

* * * * *